United States Patent
Kikuta

(10) Patent No.: US 11,609,192 B2
(45) Date of Patent: Mar. 21, 2023

(54) ENERGY DISPERSIVE X-RAY FLUORESCENT SPECTROMETER, EVALUATION METHOD, AND EVALUATION PROGRAM

(71) Applicant: Rigaku Corporation, Akishima (JP)

(72) Inventor: Shinya Kikuta, Takatsuki (JP)

(73) Assignee: Rigaku Corporation, Tokyo (JP)

( * ) Notice: Subject to any disclaimer, the term of this patent is extended or adjusted under 35 U.S.C. 154(b) by 0 days.

(21) Appl. No.: 17/641,808

(22) PCT Filed: Nov. 30, 2020

(86) PCT No.: PCT/JP2020/044556
§ 371 (c)(1),
(2) Date: Mar. 9, 2022

(87) PCT Pub. No.: WO2021/124859
PCT Pub. Date: Jun. 24, 2021

(65) Prior Publication Data
US 2022/0268717 A1 Aug. 25, 2022

(30) Foreign Application Priority Data
Dec. 19, 2019 (JP) .............................. JP2019-229275

(51) Int. Cl.
*G01N 23/2209* (2018.01)
*G01N 23/223* (2006.01)
(52) U.S. Cl.
CPC ..... *G01N 23/223* (2013.01); *G01N 2223/076* (2013.01)
(58) Field of Classification Search
CPC .. G01N 21/6402; G01N 23/223; G01N 21/31; G01N 21/64
See application file for complete search history.

(56) References Cited

U.S. PATENT DOCUMENTS

2006/0227931 A1 10/2006 Mazor et al.
2015/0276952 A1 10/2015 Morita
2016/0123909 A1 5/2016 Wormington et al.

FOREIGN PATENT DOCUMENTS

JP 2000065765 A 3/2000
JP 2001133419 A 5/2001
(Continued)

OTHER PUBLICATIONS

International Search Report dated Feb. 16, 2021, relating International Patent Application for PCT/JP2020/044556 with English translation pp. 1-4.
(Continued)

*Primary Examiner* — Don K Wong
(74) *Attorney, Agent, or Firm* — HEA Law PLLC

(57) ABSTRACT

Provided is an energy-dispersive X-ray fluorescence spectrometer capable of easily determining reliability of a result of quantitative analysis and quickly recognizing an abnormality in measurement conditions, an X-ray fluorescence spectrometer, a sample, preprocessing for the sample, or the like. The energy-dispersive X-ray fluorescence spectrometer includes: a spectrum acquisition unit configured to acquire a spectrum; a calculation unit configured to execute quantitative analysis for an element included in the sample based on a peak included in the spectrum; and an evaluation unit configured to calculate a plurality of evaluation values obtained using different calculation methods for a series of processes, being the process of acquiring the spectrum by the spectrum acquisition unit, and the process of executing the quantitative analysis by the calculation unit, and to calculate a comprehensive evaluation value obtained by composing the plurality of evaluation values.

16 Claims, 11 Drawing Sheets

(56) References Cited

FOREIGN PATENT DOCUMENTS

| JP | 2010107261 | A | 5/2010 | |
|---|---|---|---|---|
| JP | 2014173864 | A | 9/2014 | |
| JP | 5697388 | B2 * | 4/2015 | ........... G01N 23/223 |
| JP | 2019109201 | A | 7/2019 | |

OTHER PUBLICATIONS

Search Report of Dec. 20, 2022, for corresponding EP Patent Application No. 20903093.1, pp. 1-8.
Redus R. et al. "Figure of merit for spectrometers for EDXRF", X-Ray Spectrometry, vol. 41, No. 6, Sep. 7, 2012, pp. 401-409, XP093007620, GB ISSN: 0049-8246, DOI: 10.1002/xrs.2420.
Rousseau Richard M. "Detection Limit and Estimate of Uncertainty of Analytical XRF Results", The Rigaku Journal, vol. 18, No. 2, 2001, pp. 33-47, XP093007626.

* cited by examiner

FIG.5
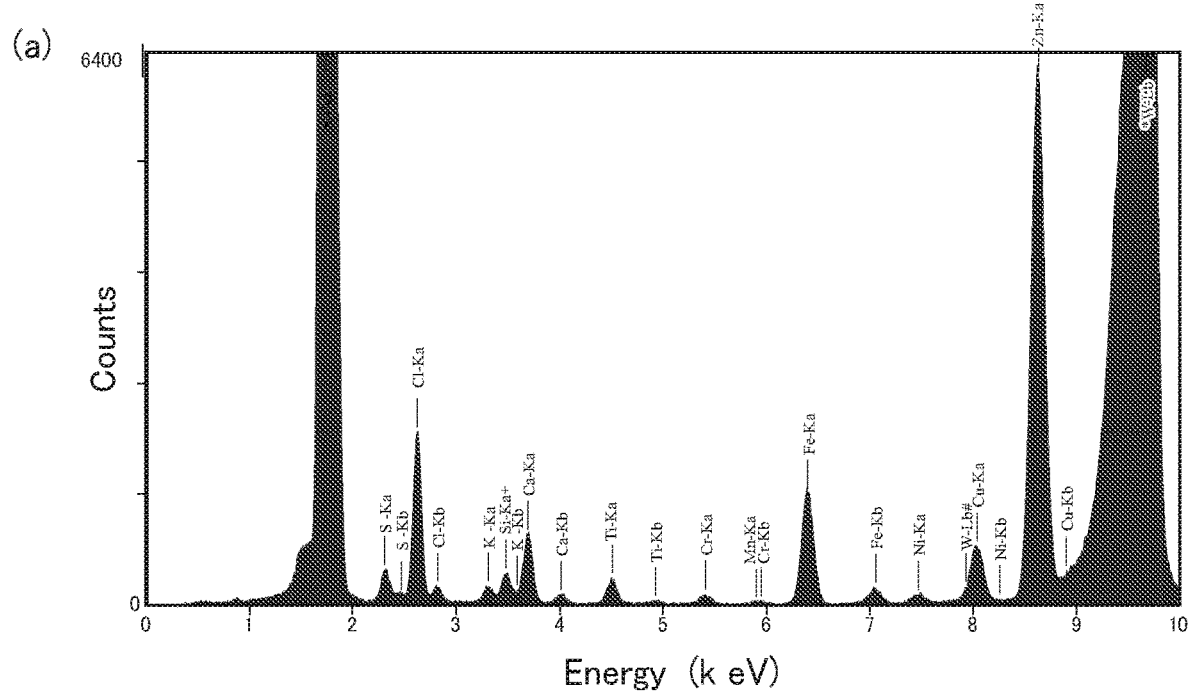
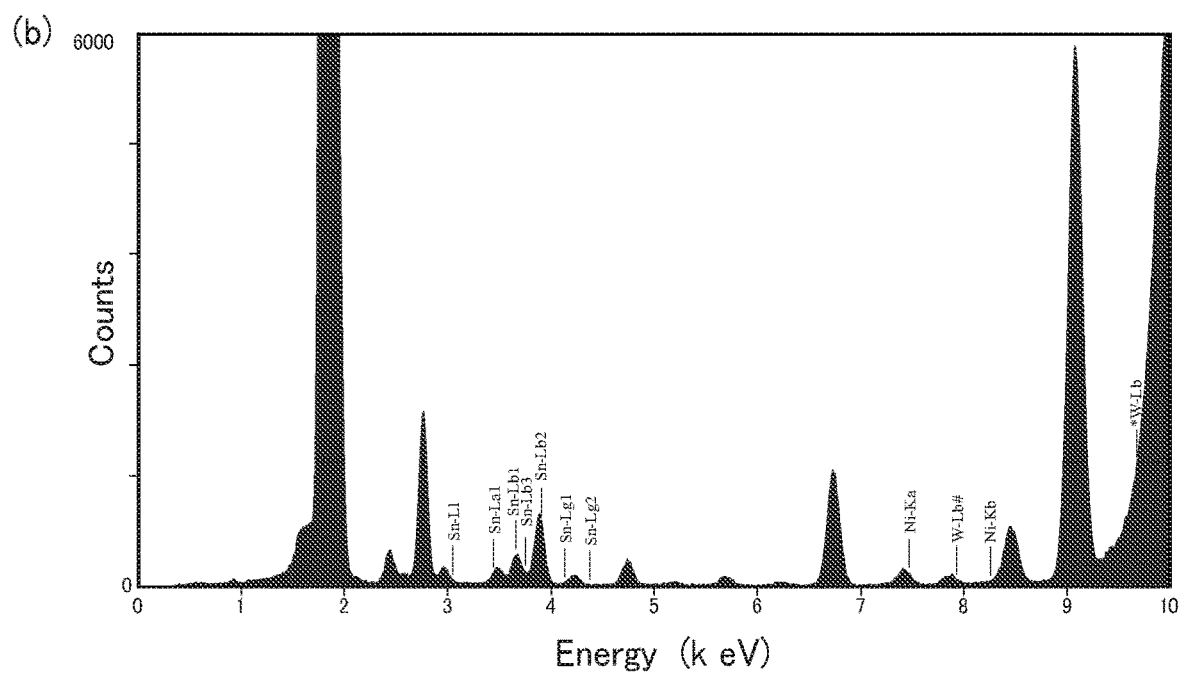

ENERGY DISPERSIVE X-RAY FLUORESCENT SPECTROMETER, EVALUATION METHOD, AND EVALUATION PROGRAM

CROSS REFERENCE TO RELATED APPLICATIONS

This application is a National Stage of International Application No. PCT/JP2020/044556 filed on Nov. 30, 2020, which claims priority from Japanese Patent Application 2019-229275, filed on Dec. 19, 2019. The contents of the above document is incorporated herein by reference in its entirety.

TECHNICAL FIELD

The present invention relates to an energy-dispersive X-ray fluorescence spectrometer, an evaluation method, and an evaluation program.

BACKGROUND ART

An X-ray fluorescence spectrometer can analyze elements included in a sample. For example, an energy-dispersive X-ray fluorescence spectrometer irradiates a sample with primary X-rays, and acquires emitted secondary X-rays as a spectrum having a width in an energy direction. Quantitative analysis for elements included in the sample is executed based on an energy position and intensity of each of peaks included in the spectrum.

When a user who is unfamiliar with X-ray fluorescence spectrometry uses the X-ray fluorescence spectrometer, it is difficult to determine whether or not a measurement result is reliable. To deal with this problem, in Patent Literature 1, there is disclosure of calculating a peak measurement period required to achieve specified analysis precision. Moreover, in Patent Literature 2, there is disclosure of calculating and displaying predicted precision corresponding to a measurement period which is set in advance.

CITATION LIST

Patent Literature

[PTL 1] JP 2000-065765 A
[PTL 2] JP 2001-133419 A

SUMMARY OF INVENTION

Technical Problem

According to Patent Literature 1, it is not possible to evaluate reliability of a series of processes of executing the quantitative analysis. Moreover, according to Patent Literature 2, only the predicted precision corresponding to the measurement period is calculated, and the reliability of the series of processes of executing the quantitative analysis cannot be evaluated. Thus, it is required for a user to observe the spectrum to determine the reliability of the result. Moreover, even when a user who is unfamiliar with the X-ray fluorescence spectrometry observes the spectrum, the user cannot verify the reliability of the measurement result, and thus trusts only values of the quantitative analysis without examining the spectrum. Thus, there is a problem in that the user does not examine whether or not the analysis result is reliable, and even when an abnormality exists in the processes for the analysis, the user does not thus notice the abnormality.

The present invention has been made in view of the above-mentioned problem, and has an object to provide an energy-dispersive X-ray fluorescence spectrometer, an evaluation method, and an evaluation program which enable even a user unfamiliar with an X-ray fluorescence spectrometry to easily determine reliability of a result of quantitative analysis, and to quickly recognize an abnormality in measurement conditions, an X-ray fluorescence spectrometer, a sample, preprocessing for the sample, or the like.

Solution to Problem

According to claim 1, there is provided an energy-dispersive X-ray fluorescence spectrometer including: a spectrum acquisition unit configured to acquire, based on secondary X-rays emitted from a sample irradiated with primary X-rays, a spectrum indicating a relationship between an intensity of the secondary X-rays and energy; a calculation unit configured to execute quantitative analysis for an element included in the sample based on a peak included in the spectrum; and an evaluation unit configured to evaluate reliability of a series of processes, being a process of acquiring the spectrum by the spectrum acquisition unit and a process of executing the quantitative analysis by the calculation unit.

According to the energy-dispersive X-ray fluorescence spectrometer of claim 2, in the energy-dispersive X-ray fluorescence spectrometer of claim 1, the evaluation unit is configured to calculate a plurality of evaluation values obtained using different calculation methods for the series of processes, and to calculate a comprehensive evaluation value obtained by composing the plurality of evaluation values.

According to the energy-dispersive X-ray fluorescence spectrometer of claim 3, the energy-dispersive X-ray fluorescence spectrometer of claim 2 further includes a display unit configured to display a graph for each of the plurality of evaluation values.

According to the energy-dispersive X-ray fluorescence spectrometer of claim 4, in the energy-dispersive X-ray fluorescence spectrometer of claim 2 or 3, the plurality of evaluation values include an evaluation value calculated based on a measurement condition at a time when the spectrum acquisition unit acquires the spectrum.

According to the energy-dispersive X-ray fluorescence spectrometer of claim 5, in the energy-dispersive X-ray fluorescence spectrometer of any one of claims 2 to 4, the plurality of evaluation values include an evaluation value calculated based on a shape of the spectrum.

According to the energy-dispersive X-ray fluorescence spectrometer of claim 6, in the energy-dispersive X-ray fluorescence spectrometer of any one of claims 2 to 5, the plurality of evaluation values include an evaluation value calculated based on a fitting parameter obtained as a result of fitting to the spectrum.

According to the energy-dispersive X-ray fluorescence spectrometer of claim 7, in the energy-dispersive X-ray fluorescence spectrometer of claim 4, the evaluation value is calculated based on a measurement period, being a period for detecting the secondary X-rays.

According to the energy-dispersive X-ray fluorescence spectrometer of claim 8, in the energy-dispersive X-ray fluorescence spectrometer of claim 4, the evaluation value is calculated based on a ratio of a period occupied by a dead time, which does not contribute to a measurement result, to a measurement period, being a period for detecting the secondary X-rays.

According to the energy-dispersive X-ray fluorescence spectrometer of claim 9, in the energy-dispersive X-ray fluorescence spectrometer of claim 4, the evaluation value is calculated based on whether an attenuator configured to attenuate the secondary X-rays is used when the secondary X-rays are detected.

According to the energy-dispersive X-ray fluorescence spectrometer of claim 10, in the energy-dispersive X-ray fluorescence spectrometer of claim 5, the evaluation value is calculated based on a matching rate between an intensity of the peak included in the spectrum and a reference intensity which is set in advance in correspondence with the peak.

According to the energy-dispersive X-ray fluorescence spectrometer of claim 11, in the energy-dispersive X-ray fluorescence spectrometer of claim 5, the evaluation value is calculated based on a ratio between an intensity of the peak included in the spectrum and an intensity of background other than the peak.

According to the energy-dispersive X-ray fluorescence spectrometer of claim 12, in the energy-dispersive X-ray fluorescence spectrometer of claim 5, the evaluation value is calculated based on a difference between a measurement value of energy of the peak included in the spectrum and a theoretical value of the energy of the peak.

According to the energy-dispersive X-ray fluorescence spectrometer of claim 13, in the energy-dispersive X-ray fluorescence spectrometer of claim 5, the evaluation value is calculated based on a difference between a measurement value indicating a width of the peak included in the spectrum and a reference value indicating a width which is set in advance in correspondence with the peak.

According to the energy-dispersive X-ray fluorescence spectrometer of claim 14, in the energy-dispersive X-ray fluorescence spectrometer of claim 6, the evaluation value is calculated based on a matching rate between the peak included in the spectrum and a profile obtained by executing fitting for the peak.

According to the energy-dispersive X-ray fluorescence spectrometer of claim 15, in the energy-dispersive X-ray fluorescence spectrometer of claim 6, the evaluation value is calculated based on the number of combinations of a peak used for quantification of an element to be analyzed and a peak caused by a different element and determined to overlap the peak of the element to be analyzed as a result of the fitting to the spectrum.

According to claim 16, there is provided an evaluation method including: a measurement step of acquiring, by an energy-dispersive X-ray fluorescence spectrometer, based on secondary X-rays emitted from a sample irradiated with primary X-rays, a spectrum indicating a relationship between an intensity of the secondary X-rays and energy; a calculation step of executing quantitative analysis for an element included in the sample based on a peak included in the spectrum; and an evaluation step of evaluating reliability of a series of processes being a process of acquiring the spectrum in the measurement step and a process of executing the quantitative analysis in the calculation step.

Further, there is provided an evaluation program to be executed by a computer used for an energy-dispersive X-ray fluorescence spectrometer, the evaluation program causing the computer to execute: a measurement step of acquiring, based on secondary X-rays emitted from a sample irradiated with primary X-rays, a spectrum indicating a relationship between an intensity of the secondary X-rays and energy; a calculation step of executing quantitative analysis for an element included in the sample based on a peak included in the spectrum; and an evaluation step of evaluating reliability of a series of processes, being a process of acquiring the spectrum in the measurement step and a process of executing the quantitative analysis in the calculation step.

Advantageous Effects of Invention

Further, even a user who is unfamiliar with the X-ray fluorescence spectrometry can easily determine reliability of the result of quantitative analysis, and can quickly recognize an abnormality in the measurement conditions, the X-ray fluorescence spectrometer, the sample, the preprocessing for the sample, or the like.

According to the invention of claim 3, when an abnormality exists in the measurement conditions, the X-ray fluorescence spectrometer, or the like, it is possible to recognize a cause which has highly likely caused the abnormality at a glance.

BRIEF DESCRIPTION OF DRAWINGS

FIG. 5 are graphs showing a difference in spectrum caused by a difference in detector and multi-channel analyzer.

DESCRIPTION OF EMBODIMENTS

Figure 1:
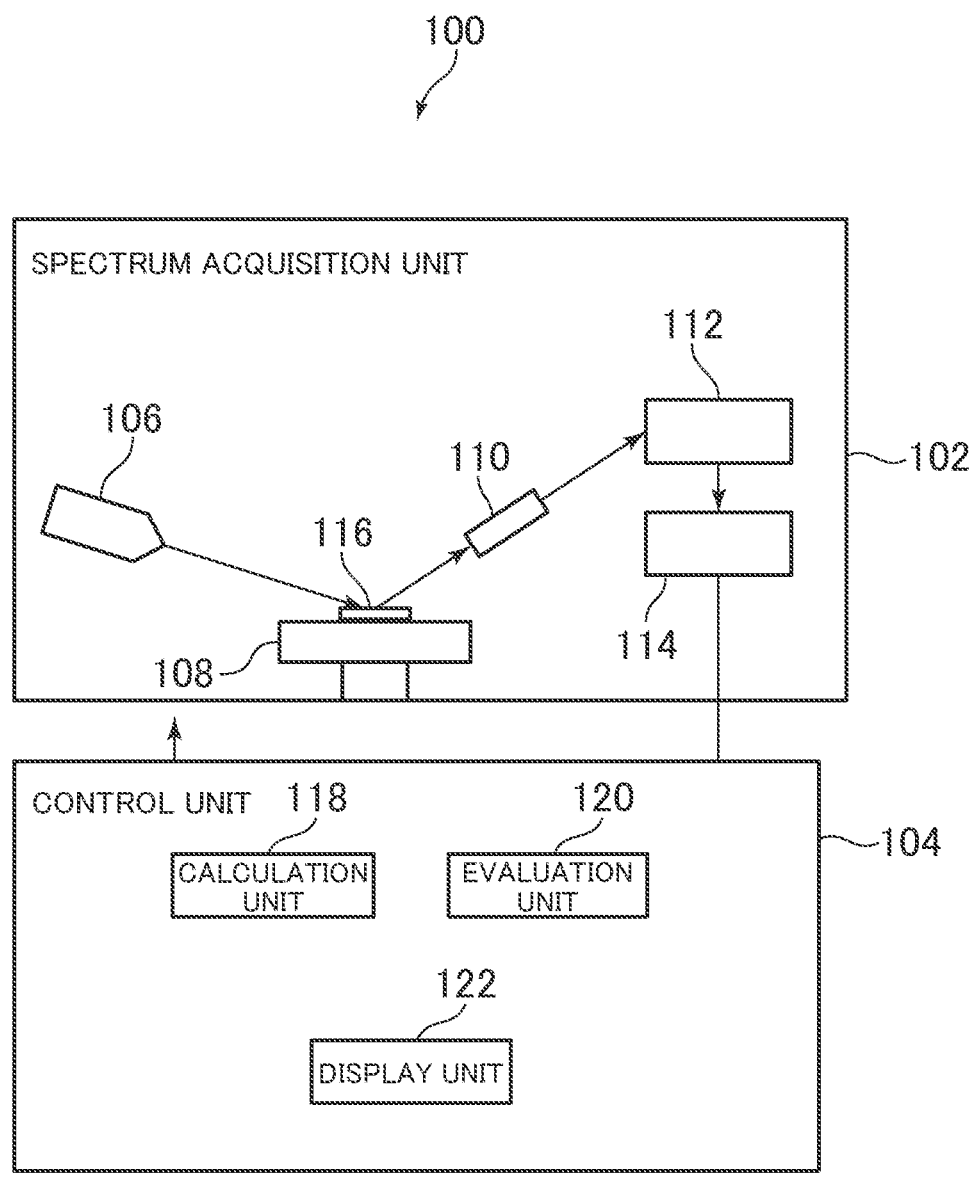
FIG. 1 is a diagram schematically illustrating an X-ray fluorescence spectrometer according to an embodiment of the present invention.

Now, a preferred embodiment for carrying out the present invention (hereinafter referred to as "embodiment") will be described. FIG. 1 is a diagram illustrating a schematic example of an X-ray fluorescence spectrometer 100.

As illustrated in FIG. 1, the X-ray fluorescence spectrometer 100 includes a spectrum acquisition unit 102 and a control unit 104.

The spectrum acquisition unit 102 acquires, based on secondary X-rays emitted from a sample 116 irradiated with primary X-rays, a spectrum indicating a relationship between an intensity of the secondary X-rays and energy. Specifically, for example, the spectrum acquisition unit 102 includes an X-ray source 106, a sample stage 108, an attenuator 110, a detector 112, and a multi-channel analyzer 114.

The sample 116 to be analyzed is placed on the sample stage 108. The X-ray source 106 irradiates a surface of the sample 116 with the primary X-rays. Secondary X-rays are emitted from the sample 116 irradiated with the primary X-rays.

The attenuator 110 is arranged between the sample 116 and the detector 112, and attenuates an intensity of the secondary X-rays. It is possible to reduce a dead time described below by arranging the attenuator 110. The attenuator 110 may be arranged between the X-ray source 106 and the sample 116, to thereby attenuate the primary X-rays.

The detector 112 is a semiconductor detector, for example, a silicon drift detector (SDD). The detector 112 measures an intensity of the secondary X-rays (florescent X-rays and scattered X-rays), and outputs a pulse signal having a pulse height corresponding to energy of the measured secondary X-rays.

The multi-channel analyzer 114 counts the pulse signal output from the detector 112 based on the pulse height. Specifically, for example, the multi-channel analyzer 114 counts the output pulse signal of the detector 112 for each channel corresponding to energy, and outputs the result of counting as an intensity of the secondary X-rays. The spectrum acquisition unit 102 acquires the output of the multi-channel analyzer 114 as a spectrum. The spectrum acquired by the spectrum acquisition unit 102 is hereinafter referred to as "measured spectrum" or, simply as "spectrum."

The control unit 104 controls the X-ray source 106, the sample stage 108, presence or absence of the attenuator 110, the detector 112, and operation of the multi-channel analyzer 114. Moreover, the control unit 104 includes a calculation unit 118, an evaluation unit 120, and a display unit 122. Specifically, the control unit 104 is a computer included in the energy-dispersive X-ray fluorescence spectrometer 100, and includes a storage unit (not shown) in which an evaluation program is stored. The control unit 104 may be a computer provided outside the spectrum acquisition unit 102, and connected to the spectrum acquisition unit 102. The evaluation program is a program to be executed by the computer used for the energy-dispersive X-ray fluorescence spectrometer 100, and is a program for causing this computer to execute each step included in an evaluation method described below.

The calculation unit 118 executes quantitative analysis for elements included in the sample 116 based on peaks included in the spectrum. Specifically, for example, the calculation unit 118 executes fitting for each of the peaks included in the measured spectrum acquired by the spectrum acquisition unit 102, to thereby acquire a theoretical profile. The theoretical profile is represented in a form of a sum of approximation functions of the respective peaks. The approximation function of each peak is formed of an appropriate function, for example, a Gaussian function, indicating a theoretical intensity calculated through use of a content rate and physical constants of each element included in the sample 116 and device constants and a shape of the peak. The theoretical profile is a function having the content rate of each element as a parameter, and hence, a content rate such that the theoretical profile best fits to the spectrum obtained through the measurement is obtained by the least squares method. As a result, the elements included in the sample 116 can be quantitatively analyzed. Moreover, the calculation unit 118 may execute quantitative analysis without the peak fitting. For example, the calculation unit 118 may calculate a peak intensity based on a measured spectrum in a set energy range, and may execute quantitative analysis by the calibration curve method based on the calculated peak intensity. The evaluation unit 120 evaluates reliability of a series of processes, being a process of acquiring the spectrum by the spectrum acquisition unit 102 and the process of executing the quantitative analysis by the calculation unit 118. Specifically, for example, the evaluation unit 120 calculates, for the series of processes, a plurality of evaluation values obtained using different calculation methods, and calculates a comprehensive evaluation value obtained by composing the plurality of evaluation values. The plurality of evaluation values include, for example, an evaluation value calculated based on measurement conditions at the time when the spectrum acquisition unit 102 acquires the spectrum, an evaluation value calculated based on the shape of the spectrum, and an evaluation value calculated based on fitting parameters obtained as a result of the fitting to the spectrum.

The display unit 122 displays a graph for each of the plurality of evaluation values. Specifically, for example, the display unit 122 displays each of the evaluation values calculated by the evaluation unit 120 as a graph such as a radar chart, a bar graph, a line graph, or the like. Moreover, the display unit 122 may display the comprehensive evaluation value calculated by the evaluation unit 120 such that the comprehensive evaluation value is superimposed on the spectrum.

Figure 2:
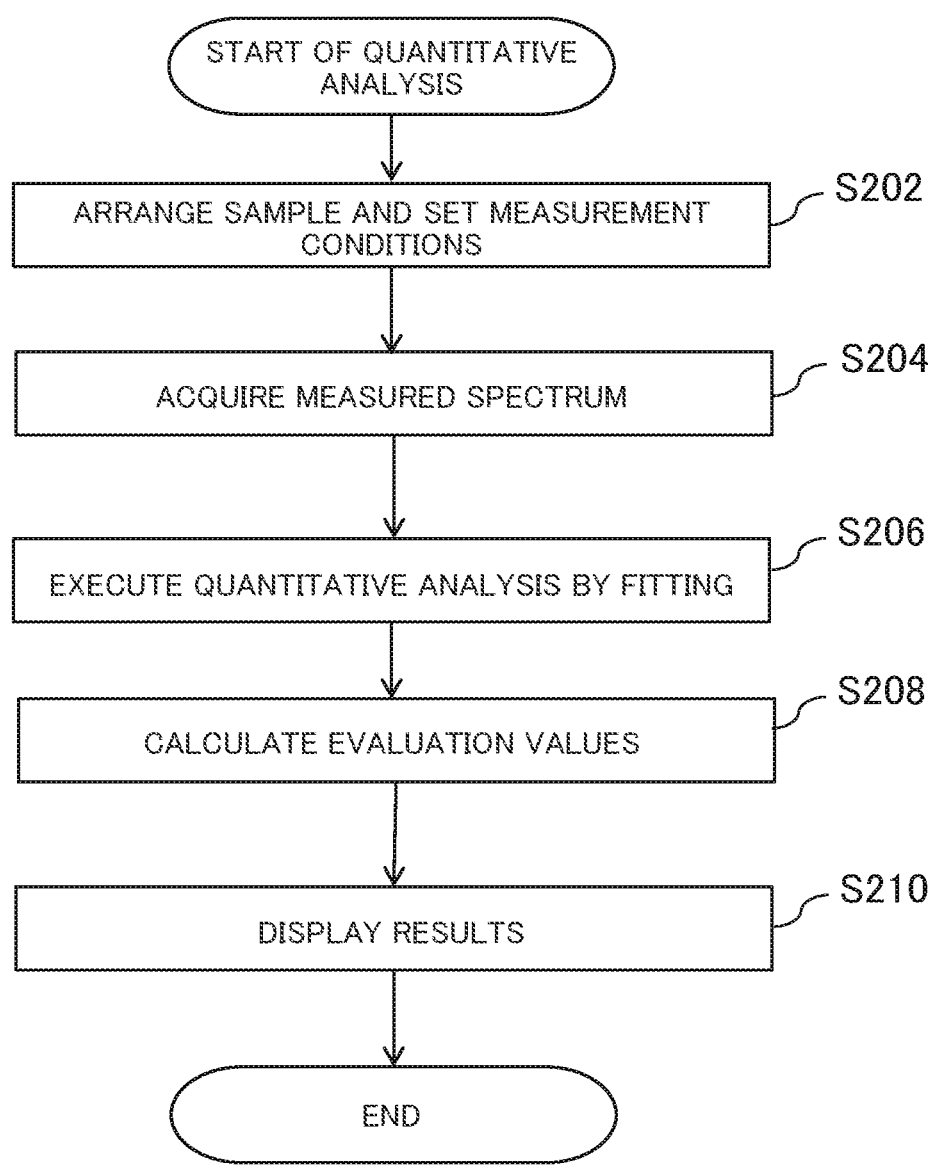
FIG. 2 is a flowchart illustrating a flow of an evaluation method.

With reference to FIG. 2, description is now given of the series of processes for evaluating the reliability. First, the sample 116 is placed, and the measurement conditions are set (Step S202). Specifically, for example, the sample 116 to be analyzed is placed on the sample stage 108, and each of the measurement conditions is set. The measurement conditions to be set are, for example, a measurement period being a period for detecting the secondary X-rays emitted from the sample 116, and the presence or absence of the attenuator 110 for attenuating the secondary X-rays when the secondary X-rays are detected. Moreover, the measurement conditions to be set may include, for example, magnitudes of current and voltage of the X-ray source 106, an angle of the irradiation of the sample 116 with the primary X-rays, and a position of the irradiation with the primary X-rays.

After that, the spectrum acquisition unit 102 acquires the spectrum (Step S204). Specifically, for example, the X-ray source 106 irradiates the sample 116 with the primary X-rays in accordance with the measurement conditions set in Step S202. The detector 112 measures the intensity of the secondary X-rays, to thereby output the pulse signal. The counter 114 counts the pulse signal output from the detector 112 based on the pulse height. After that, the spectrum acquisition unit 102 acquires the output of the multi-channel analyzer 114 as the spectrum. In this case, the spectrum acquisition unit 102 acquires the measurement conditions that vary in the course of the acquisition of the spectrum. For example, the spectrum acquisition unit 102 acquires, as the measurement condition, a ratio of a period occupied by the dead time, which does not contribute to the measurement result, to the measurement period, being the period for detecting the secondary X-rays.

After that, the calculation unit 118 executes the quantitative analysis based on the acquired spectrum (Step S206). Specifically, for example, the calculation unit 118 executes the quantitative analysis by executing the fitting for each of the peaks included in the spectrum acquired in Step S204 to acquire the theoretical profile matching the measured spectrum.

After that, the evaluation unit 120 calculates the evaluation values (Step S208). Specifically, for example, the evaluation unit 120 evaluates the reliability of the series of processes including the process executed by the spectrum acquisition unit 102 in Step S202 and Step S204 and the process executed by the calculation unit 118 in Step S206.

For example, the evaluation unit 120 calculates an evaluation value based on the measurement period. Specifically, in X-ray fluorescence spectrometry, owing to statistical fluctuation, the reliability of the analysis decreases as the measurement period in which the detector 112 detects the secondary X-rays decreases. Meanwhile, as the measurement period increases, the reliability of the analysis increases. That is, the measurement period and the reliability of the series of processes relating to the analysis correlate with each other. Thus, the evaluation unit 120 calculates the evaluation value such that as the measurement period increases, the evaluation value increases. Specifically, for example, the evaluation unit 120 calculates a first evaluation value $V_1$ as given by Expression 1 such that the evaluation value is 100 when the measurement period Tm is 1,000 seconds and the evaluation value decreases as the measurement period Tm decreases.

$$V_1 = \frac{100}{\sqrt{1000}} \times \sqrt{Tm} \quad \text{[Expression 1]}$$

Moreover, for example, the evaluation unit 120 calculates an evaluation value based on the ratio of the period occupied by the dead time, which does not contribute to the measurement result, to the measurement period. Specifically, in the detector 112, there is a period which is from the incidence of one secondary X-ray to the output of one pulse signal, and in which a next secondary X-ray cannot be detected even when the next secondary X-ray enters. Moreover, the multi-channel analyzer 114 executes waveform shaping for the pulse signal output by the detector 112, and when a pulse signal is input during the waveform shaping of a previous one pulse signal, count loss occurs in the counting. That is, the multi-channel analyzer 114 has the period in which the secondary X-rays cannot be detected. As the ratio of the periods in which the secondary X-rays cannot be detected (dead time) increases, the reliability of the analysis decreases. Thus, the evaluation unit 120 calculates the evaluation value such that the evaluation value increases as the dead time decreases. Specifically, for example, the evaluation unit 120 calculates a second evaluation value $V_2$ as given by Expression 2 such that the evaluation value is 100 when the dead time Td is 0% and the evaluation value decreases as the dead time Td increases.

$$V_2 = 100 \times \sqrt{1 - \frac{Td}{100}} \quad \text{[Expression 2]}$$

Moreover, for example, the evaluation unit 120 calculates an evaluation value based on whether or not the attenuator 110 is used. Specifically, while the attenuator 110 has an effect of reducing the dead time, the attenuator 110 attenuates the intensity of the secondary X-rays incident on the detector 112. The attenuation of the intensity of the secondary X-rays reduces the reliability of the analysis. Thus, the evaluation unit 120 calculates the evaluation value such that the evaluation value is small when the attenuator 110 is used, and the evaluation value is large when the attenuator 110 is not used. Specifically, for example, the evaluation unit 120 calculates a third evaluation value $V_3$ as given by Expression 3 such that the evaluation value is 100 when the attenuator 110 is not used, and the evaluation value decreases as an attenuation rate A (%) of the attenuator 110 increases.

$$V_3 = 100 \text{(when attenuator is not used)}, \quad \text{[Expression 3]}$$
$$V_3 = 100 \times \sqrt{1 - \frac{A}{100}} \text{ (when attenuator is used)}$$

Moreover, for example, the evaluation unit 120 calculates an evaluation value based on a matching rate between an intensity of the peak included in the spectrum and a reference intensity set in advance in correspondence with the peak. Specifically, for example, when total reflection X-ray fluorescence analysis is to be executed, the sample 116 is irradiated with the primary X-rays at an incident angle smaller than the total reflection angle with respect to the surface of the sample 116. When the sample 116 is a substrate having a thin disc shape, for example, a wafer, and there exists bending or warpage, there occurs variation in an incident angle between the primary X-rays and the substrate surface for each position (measurement point) to be measured even when the X-ray source 106 is fixed. In a case in which the incident angle is larger than the total reflection critical angle, there is a small change in intensity of the secondary X-rays in accordance with the change in incident angle, but the total reflection X-ray fluorescence analysis cannot be executed. In a case in which the incident angle is smaller than the total reflection critical angle, when the incident angle changes slightly at each of the measurement points, the intensity of the secondary X-rays counted at each of the measurement points changes greatly.

Figure 3:
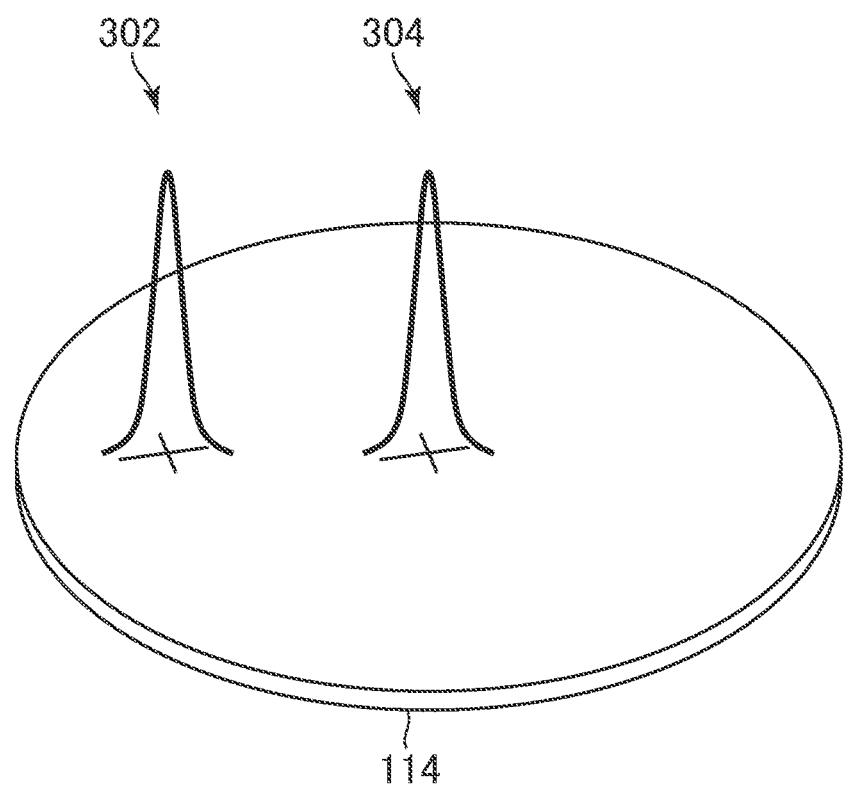
FIG. 3 is a diagram illustrating an example of positions to be analyzed of a substrate.

Meanwhile, as illustrated in FIG. 3, when the surface of the substrate is flat, an incident angle at the position of the substrate to be analyzed and an incident angle at a center of the substrate being a reference position are substantially the same. Consequently, there is substantial matching between an intensity of a peak 302 included in a spectrum acquired when the position of the substrate to be analyzed is irradiated with the primary X-rays, and an intensity (reference intensity) of a corresponding peak 304 included in a spectrum acquired in advance by irradiating the center of the substrate with the primary X-rays.

In view of this, the evaluation unit 120 calculates the evaluation value based on a matching rate between the intensity (measurement intensity) of the peak included in the spectrum acquired when the position of the substrate to be analyzed is irradiated with the primary X-rays, and the intensity (reference intensity) of the corresponding peak included in the spectrum acquired in advance by irradiating the center of the substrate with the primary X-rays. Specifically, for example, the evaluation unit 120 calculates a fourth evaluation value $V_4$ as given by Expression 4 such that the evaluation value is 100 when a measurement intensity Im is the same as a reference intensity Is, and the evaluation value decreases as a difference between the measurement intensity Im and the reference intensity Is increases. Moreover, the reference intensity may be intensity acquired not from the sample to be analyzed, but from a reference sample.

$$V_4 = \left(1 - \left|\frac{Is - Im}{Is}\right|\right) \times 100 \quad \text{[Expression 4]}$$

Moreover, for example, the evaluation unit 120 calculates an evaluation value based on a ratio of a total intensity of respective peaks included in the spectrum to a background intensity other than those peaks. Specifically, the secondary X-rays include not only florescent X-rays unique to the elements used for the element analysis, but background that does not contribute to the element analysis, such as the scattered X-rays and diffracted X-rays of the primary X-rays. As a ratio of the background to the florescent X-rays increases, the S/N ratio decreases, and the reliability of the analysis thus decreases.

In view of this, the evaluation unit 120 calculates the evaluation value such that the evaluation value decreases as a ratio of a total intensity It of the respective peaks of the fluorescent X-rays to the background intensity Ib decreases, and the evaluation value increases as the ratio increases. Specifically, for example, the evaluation unit 120 calculates a fifth evaluation value $V_5$ as given by Expression 5 such that the evaluation value is 0 when the ratio of the total intensity It of the respective peaks of the fluorescent X-rays to the background intensity Ib is 1, and the evaluation value increases as the ratio of the total intensity It of the peaks to the background intensity Ib increases. With Expression 5, there can be obtained the evaluation value in which not only the fluorescent X-rays, but also the scattered X-rays, the diffracted X-rays, and the like are taken into consideration. The background intensity may be obtained by fitting to the entire spectrum or by summing background intensities corresponding to the respective peaks of the fluorescent X-rays.

$$V_5 = \left(1 - \frac{Ib}{It}\right) \times 100 \quad \text{[Expression 5]}$$

Figure 4:
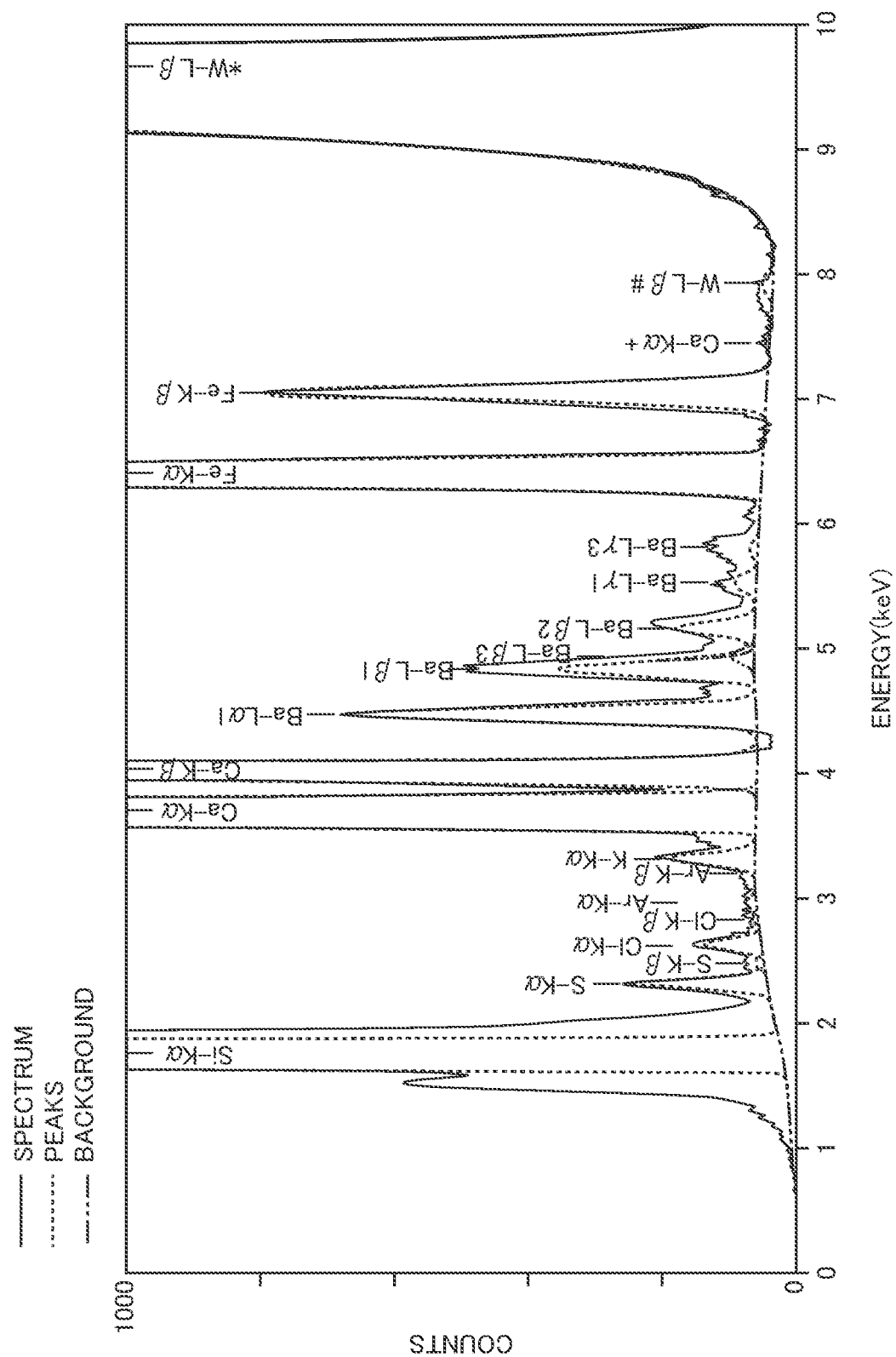
FIG. 4 is a graph showing an example of peaks and a background separated from each other.

FIG. 4 is a graph showing peaks and background separated from each other as a result of fitting to a measured spectrum. The evaluation unit 120 calculates the background intensity Ib and the total intensity It of the respective peaks in an appropriately set energy range. For example, the evaluation unit 120 may calculate the fifth evaluation value based on the total intensity of the respective peaks and the background intensity in the entire energy range of FIG. 4 and Expression 5. Moreover, the evaluation unit 120 may calculate the fifth evaluation value based on the total intensity of the respective peaks and the background intensity in a predetermined energy range of FIG. 4 and Expression 5.

Moreover, for example, the evaluation unit 120 calculates an evaluation value based on a difference between a measurement value of energy of the peak included in the spectrum and a theoretical value of the energy of this peak. Specifically, the energy of the fluorescent X-rays emitted from a specific element is a value (theoretical value) unique to this element. The detector 112 and the multi-channel analyzer 114 are set so that the energy (measurement value at the peak position) included in the measured spectrum, and the energy (theoretical value at the peak position) unique to the element corresponding to this peak, match each other. When a problem occurs in the detector 112 and the multi-channel analyzer 114, a difference occurs between the measurement value at the peak position and the theoretical value.

For example, the spectra of FIG. 5(a) and FIG. 5(b) are measurement results for the same sample. The spectrum of FIG. 5(a) is a spectrum which was measured through use of a normal detector 112 and a normal multi-channel analyzer 114. The spectrum of FIG. 5(b) is a spectrum which was measured through use of an abnormal detector 112 and an abnormal multi-channel analyzer 114. Each peak of FIG. 5(b) is shifted, from the corresponding peak of FIG. 5(a), toward a high energy side more as the energy increases.

That is, the position of each peak included in the spectrum measured through use of the abnormal detector 112 and multi-channel analyzer 114 is different from the theoretical value. In view of this, the evaluation unit 120 calculates the evaluation value through use of a magnitude of this difference for at least one peak. Specifically, the evaluation unit 120 calculates the evaluation value such that the evaluation value increases as the difference between a measurement value Em of the energy of the peak included in the spectrum and a theoretical value Es of the energy of this peak decreases, and the evaluation value decreases as the difference increases. For example, the evaluation unit 120 calculates a sixth evaluation value $V_6$ as given by Expression 6.

$$V_6 = \left(1 - \frac{|Em - Es|}{Es}\right) \times 100 \quad \text{[Expression 6]}$$

Figure 6:
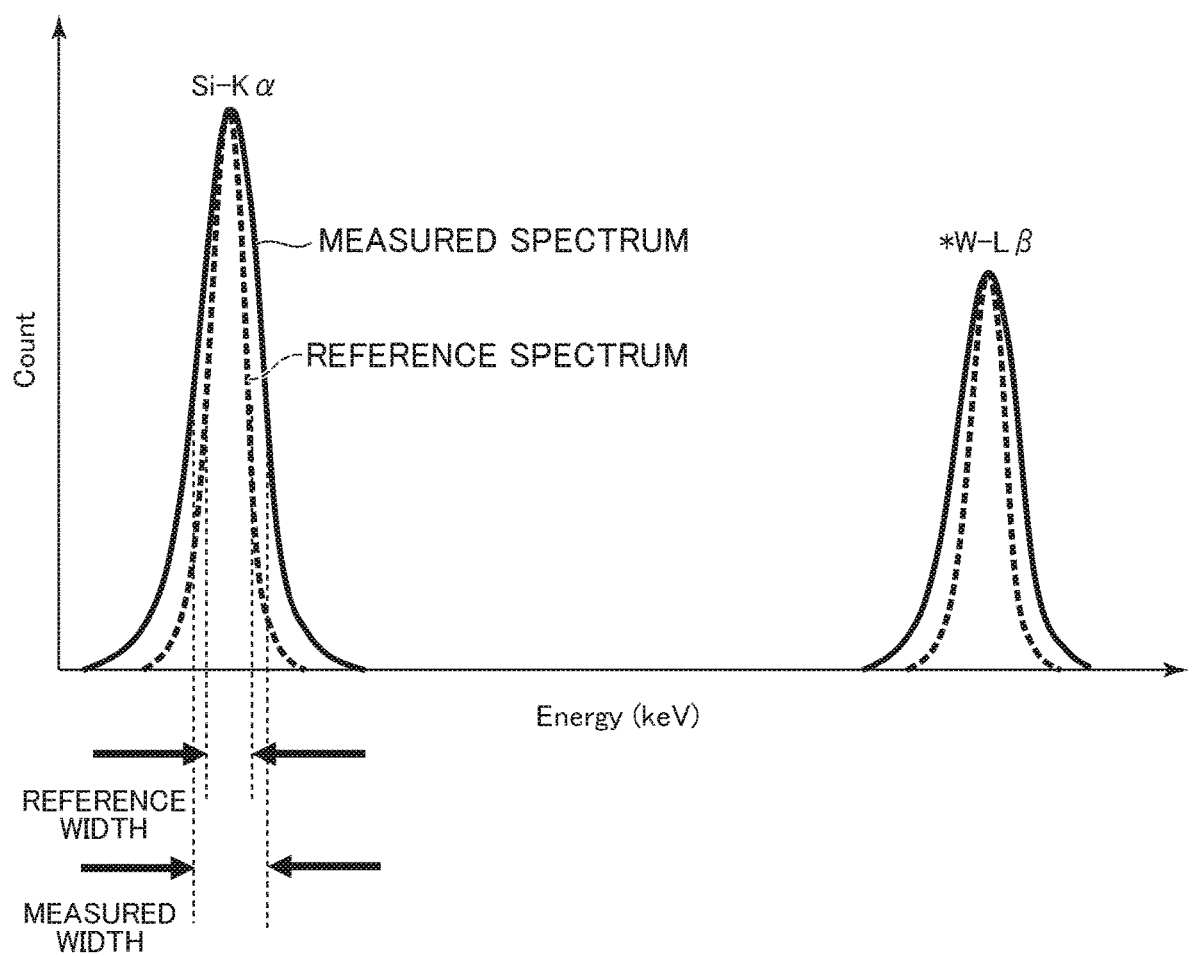
FIG. 6 is a graph showing an example of a measured spectrum and a reference spectrum.

Moreover, for example, the evaluation unit 120 calculates an evaluation value based on a difference between a measurement value indicating a width of the peak included in the spectrum and a reference value indicating a width which is set in advance in correspondence with this peak. Specifically, the measurement value indicating the width of the peak is, for example, a full width at half maximum. The full width at half maximum of the peak increases due to failure of the detector 112 and the multi-channel analyzer 114, an abnormality of spectroscopy (monochromator) of the primary X-rays, counting including an outside of the range in which the spectrum is displayed, an increase in noise, and the like. For example, as shown in FIG. 6, the full width at half maximum of the peak included in the measured spectrum may be wider than a full width at half maximum of a peak included in a reference spectrum set in advance. The full width at half maximum (which is set as a reference value) of the peak included in the reference spectrum may appropriately be set based on the element included in the sample, a form of the sample, and the like. Specifically, the evaluation unit 120 calculates the evaluation value such that the evaluation value decreases as a difference of a full width at half maximum FWHMm of the peak included in the spectrum, from a reference value FWHMs of the full width at half maximum of this peak, increases. For example, the evaluation unit 120 calculates a seventh evaluation value $V_7$ as given by Expression 7. When the seventh evaluation value $V_7$ is larger than 100, the seventh evaluation value $V_7$ is set to 100. When the seventh evaluation value $V_7$ is smaller than 0, the seventh evaluation value $V_7$ is set to 0.

$$V_7 = \left(1 - \frac{FWHMm - FWHMs}{FWHMs}\right) \times 100 \quad \text{[Expression 7]}$$

Moreover, for example, the evaluation unit 120 calculates an evaluation value based on a matching rate between the peak included in the spectrum and a profile obtained by executing fitting for this peak. Specifically, the calculation unit 118 executes the fitting for each of peaks included in the measured spectrum, to thereby obtain the theoretical profile. The theoretical profile is based on the function having the content rate of each element as a parameter. Thus, the reliability of the analysis increases as the matching rate between the peak included in the spectrum and the profile obtained by executing the fitting for the peak increases. In view of this, the evaluation unit 120 calculates the evaluation value such that the evaluation value increases as the matching rate increases, and the evaluation value decreases as the matching rate decreases. Specifically, for example, the evaluation unit 120 sums a measurement intensity $Im_{ch}$ in respective channels ch of the multi-channel analyzer 114 and a calculated intensity $If_{ch}$ of the theoretical profile in the corresponding respective channels ch in a range of from "i" to "n" of the channels ch. After that, the evaluation unit 120 calculates an eighth evaluation value $V_8$ as given by Expression 8 such that the evaluation value is 100 when there is no difference between the sum of the measurement intensity $Im_{ch}$ and the sum of the calculated intensity $If_{ch}$, and the evaluation value decreases as the difference increases.

$$V_8 = \left(1 - \frac{\sum_{ch=i}^{n}|Im_{ch} - If_{ch}|}{\sum_{ch=i}^{n} Im_{ch}}\right) \times 100 \qquad \text{[Expression 8]}$$

Figure 7:
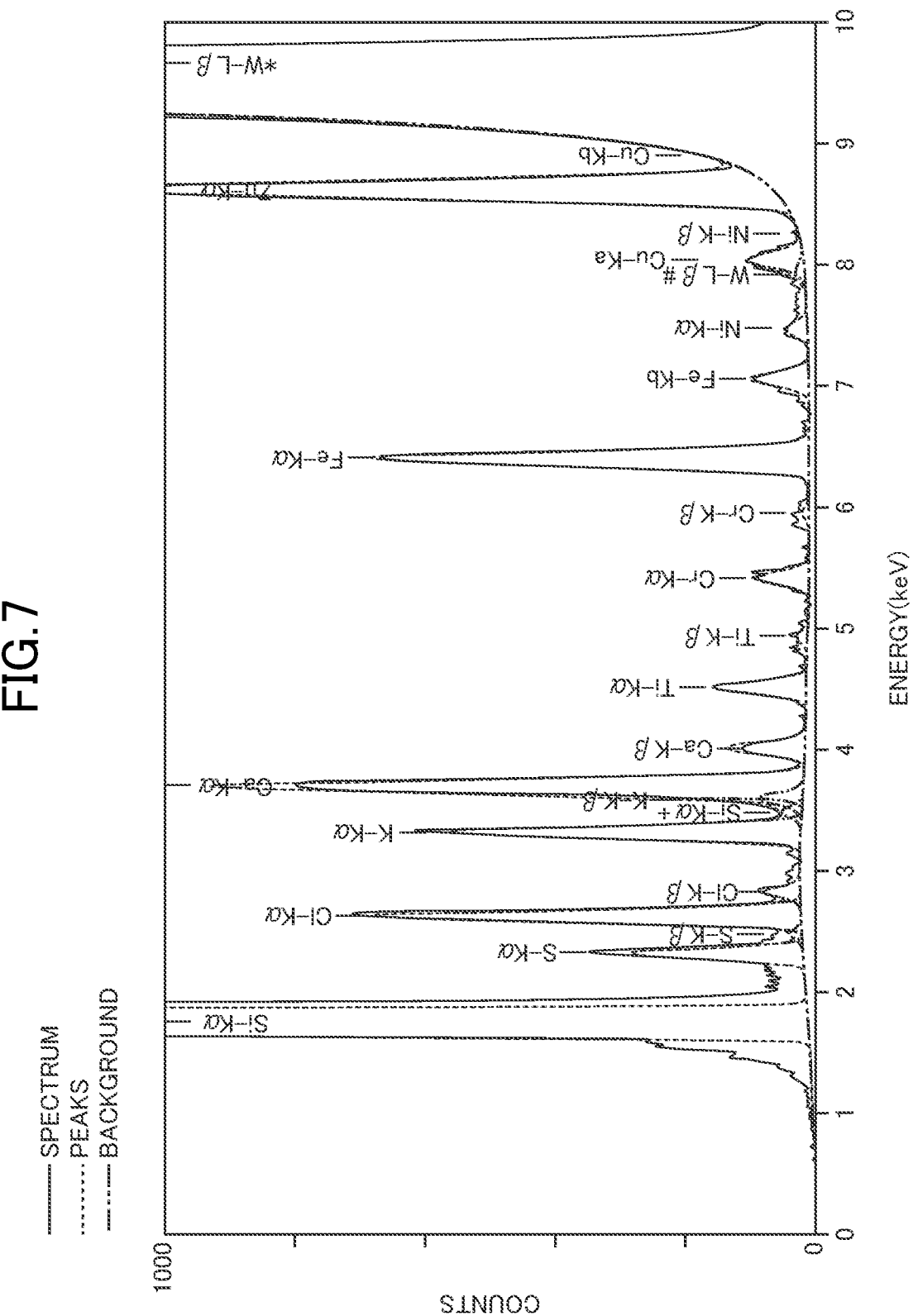
FIG. 7 is a graph showing an example of a measured spectrum and a theoretical profile.

For example, FIG. 7 is a graph showing the spectrum acquired by the spectrum acquisition unit 102 and the theoretical profile acquired as a result of the fitting to the spectrum, which are superimposed on each other. In the example shown in FIG. 7, the evaluation value calculated based on Expression 8 is 95. The range ("i" to "n") of the channels for which the sums are calculated as given by Expression 8 may include all of the channels of the multi-channel analyzer or channels in a specified range. Moreover, the range ("i" to "n") of the channels for which the sums are calculated may be a discontinuous channel range corresponding to energy ranges of the full widths at half maximum of all of the peaks or specified peaks.

Moreover, for example, the evaluation unit 120 calculates an evaluation value based on the number of combinations of the peak used for the quantification of the element to be analyzed and a peak caused by a different element and determined to overlap the peak of the element to be analyzed as a result of fitting to the spectrum. Specifically, as described above, the calculation unit 118 executes the fitting for each peak included in the measured spectrum, to thereby acquire the theoretical profile. In this case, for the peak included in the spectrum and used for the quantification of the element to be analyzed, a peak caused by a different element may appear at an overlapping energy position (for example, ranges of the full widths at half maximum of both of the peaks may overlap each other over a predetermined rate or more).

Figure 8:
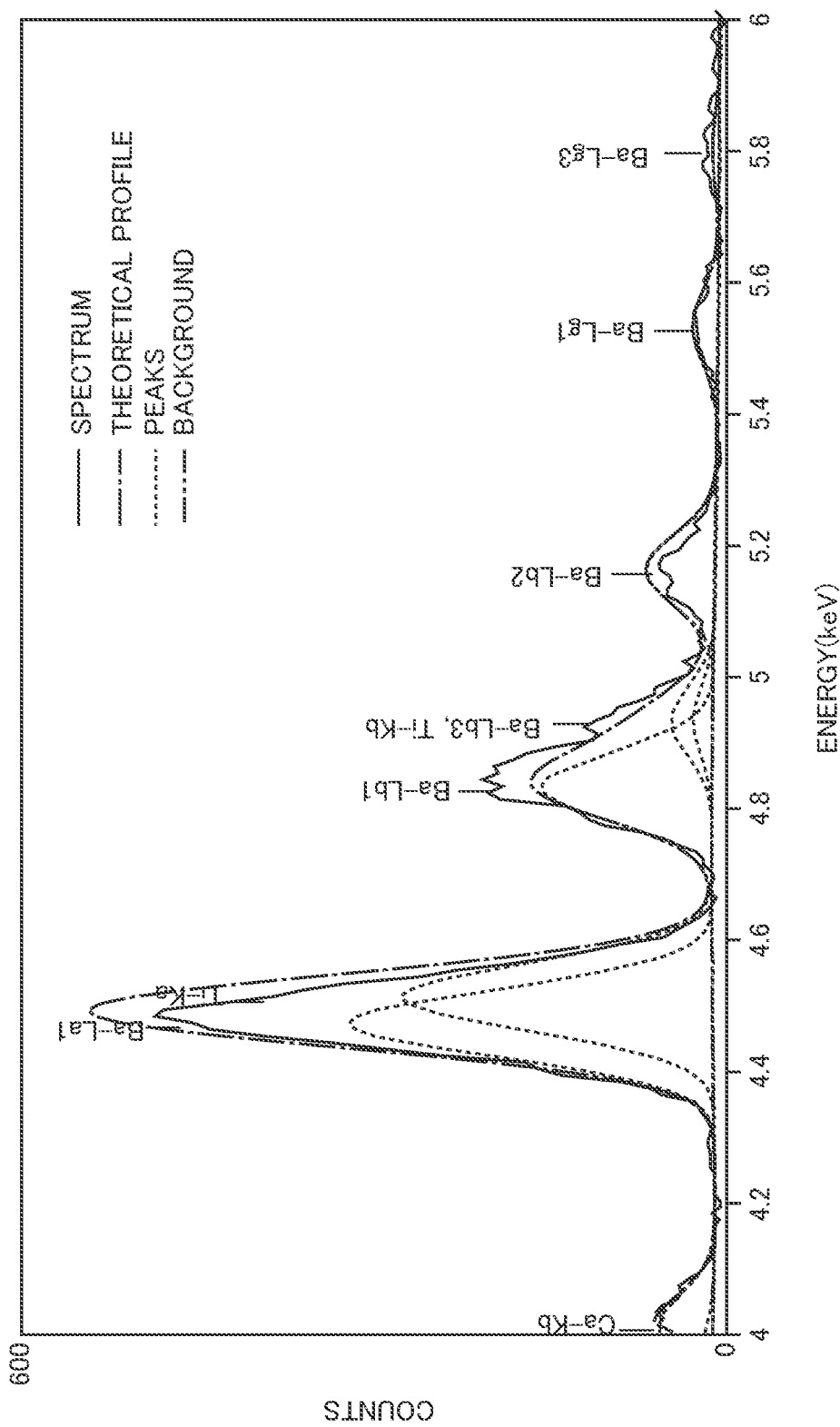
FIG. 8 is a graph showing an example of a measured spectrum and a theoretical profile.

For example, FIG. 8 is a graph showing the measured spectrum acquired by the spectrum acquisition unit 102 and the theoretical profile acquired as a result of the fitting to this spectrum, which are superimposed on each other. As shown in FIG. 8, full widths at half maximum of the Ti-Kα line and the Ba-Lα1 line overlap each other over 50% or more.

When the peaks overlap each other, it is difficult to accurately separate an element causing the peak intensity. Thus, the precision of the fitting decreases, and the reliability of the analysis consequently decreases. Moreover, as the number of overlapping peaks increases, the reliability of the analysis decreases. In view of this, the evaluation unit 120 calculates the evaluation value such that the evaluation value decreases as the number Dp of overlapping peaks increases, and the evaluation value increases as the number Dp of overlapping peaks decreases. Specifically, for example, the evaluation unit 120 calculates a ninth evaluation value $V_9$ as given by Expression 9 such that the evaluation value is 100 when the number Dp of overlapping peaks is 0, and the evaluation value decreases as the number Dp of overlapping peaks increases. Dmax is the maximum assumed number of overlapping peaks. When three or more peaks overlap one another, the number of overlapping peaks may be counted by adding the number of overlapping peaks.

$$V_9 = 100 \times \frac{Dmax - Dp}{Dmax} \qquad \text{[Expression 9]}$$

Further, the evaluation unit 120 calculates a comprehensive evaluation value $V_{all}$ based on the first evaluation value $V_1$ to the ninth evaluation value $V_9$ obtained through the different calculation methods. The comprehensive evaluation value $V_{all}$ is obtained by composing a plurality of evaluation values. For example, the evaluation unit 120 calculates comprehensive evaluation value $V_{all}$ as given by Expression 10. Symbols "i", "j", "k", "l", "m", "n", and "o" are weighting coefficients for relatively adjusting the respective evaluation values, and are appropriately set. Some of "i", "j", "k", "l", "m", "n", and "o" may be 0. Expression 10 indicates that a weighted average of the first evaluation value $V_1$, the second evaluation value $V_2$, the fourth evaluation value $V_4$, the fifth evaluation value $V_5$, the sixth evaluation value $V_6$, the seventh evaluation value $V_7$, and the eighth evaluation value $V_8$ is obtained, and the obtained value of the weighted average is multiplied by ratios of the third evaluation value $V_3$ and the ninth evaluation value Vg. That is, first, the evaluation values having low influence on other evaluation values due to the nature of the respective evaluation values (for example, even when the measurement conditions are changed such that the first evaluation value $V_1$ changes, the change in the second evaluation value $V_2$ is relatively small) are used, to thereby calculate a basic evaluation value. After that, the basic evaluation value is multiplied by the ratios of the evaluation values, which are, for example, the presence or absence of the attenuator 110 and the number of the combinations of overlaps of the peaks, and that have high influence on other evaluation values (for example, when the measurement conditions are changed such that the third evaluation value $V_3$ changes, the change in the second evaluation value $V_2$ is relatively large). As a result, it is possible to calculate the comprehensive evaluation value $V_{all}$ having high correlation with the reliability of the series of processes.

$$V_{all} = \frac{i \times V_1 + j \times V_2 + k \times V_4 + l \times V_5 + m \times V_6 + n \times V_7 + o \times V_8}{i + j + k + l + m + n + o} \times \frac{V_3}{100} \times \frac{V_9}{100} \qquad \text{[Expression 10]}$$

As described above, in Step S208, the evaluation unit 120 calculates the evaluation values and the comprehensive evaluation value $V_{a11}$. The first evaluation value $V_1$ to the ninth evaluation value $V_9$ and $V_{a11}$ are examples, and other evaluation values correlating with the series of processes, including the process of acquiring the spectrum by the spectrum acquisition unit 102 and the process of executing the quantitative analysis by the calculation unit 118, may be calculated.

Further, the display unit 122 displays the evaluation values calculated in Step S208 (Step S210). Specifically, for example, the display unit 122 ranks the first evaluation value $V_1$ to the ninth evaluation value Vg into A, B, C, and D based on the respective values of the first evaluation value $V_1$ to the ninth evaluation value $V_9$, and shows the ranks as a radar chart of FIG. 9. The rank A corresponds to an excellent rank. The rank B corresponds to a good rank. The rank C corresponds to an acceptable rank. The rank D corresponds to an unacceptable rank. After that, when an evaluation value corresponding to the rank D exists, the display unit 122 displays an assumed cause as a text, and recommends a user to execute the measurement again.

Figure 9:
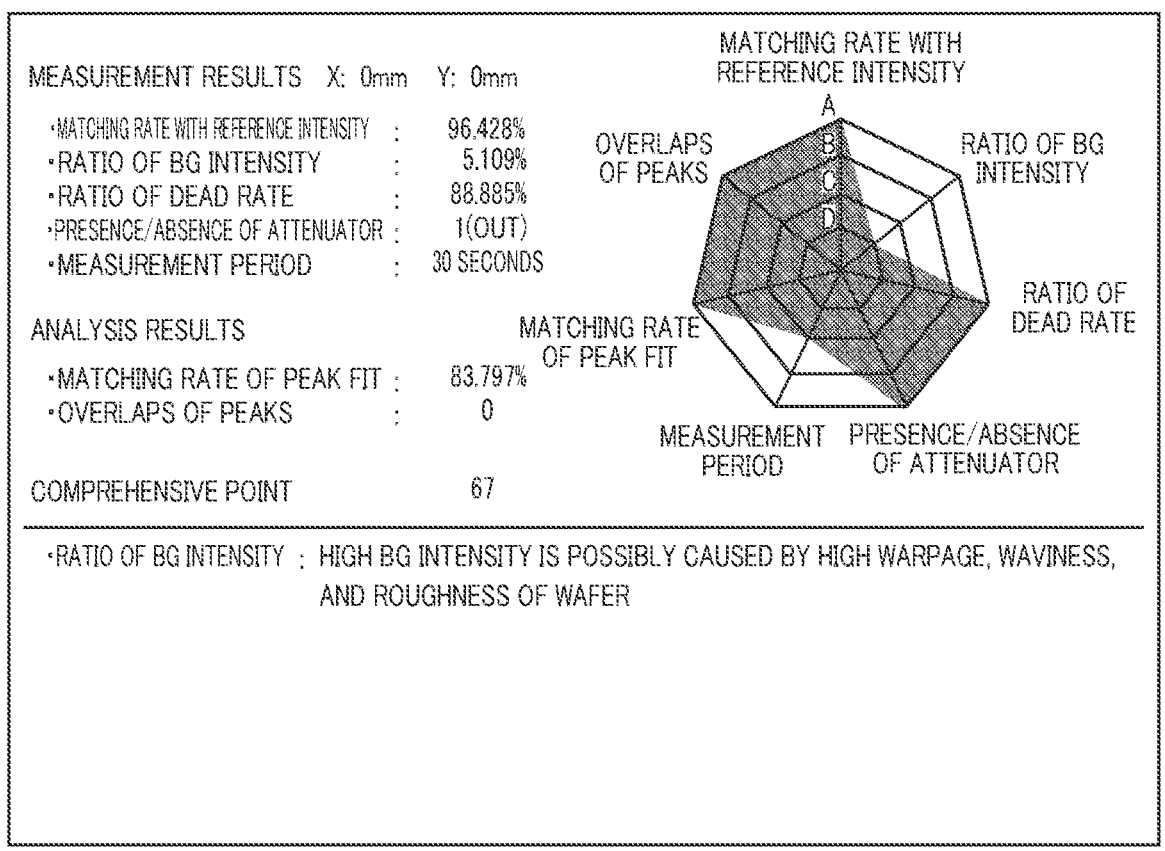
FIG. 9 is a diagram illustrating an example of evaluation results.

In evaluation results of FIG. 9, the fifth evaluation value $V_5$ is low, and a cause assumed as the cause of this low evaluation value is thus displayed. For example, as the cause of the low fifth evaluation value $V_5$, "High BG intensity is possibly caused by high warpage, waviness, and roughness of wafer." is displayed. This text is text set in advance in correspondence to the value of each evaluation value and the characteristics of each evaluation value.

Moreover, the display unit 122 displays, as numerical values, the respective values of the first evaluation value $V_1$ to the ninth evaluation value Vg. For example, in FIG. 9, "Measurement period" indicating the first evaluation value $V_1$, "Ratio of dead rate" indicating the second evaluation value $V_2$, "Presence or absence of attenuator 110" indicating the third evaluation value $V_3$, "Matching rate with reference intensity" indicating the fourth evaluation value $V_4$, "Ratio of BG intensity" indicating the fifth evaluation value $V_5$, "Matching rate of peak fit" indicating the eighth evaluation value $V_8$, and "Overlap of peaks" indicating the ninth evaluation value $V_9$ are displayed. In order to promote intuitive understanding of the user, the display of each evaluation value may be a combination of a numerical value represented as points and a specific set value or a detected value. Moreover, values obtained by multiplying the respective evaluation values by the weighting coefficients described above may be displayed. The sixth evaluation value $V_6$ and the seventh evaluation value $V_7$ are not illustrated in FIG. 9, but the display unit 122 may display a radar chart including the sixth evaluation value $V_6$ and the seventh evaluation value $V_7$.

Figure 10:
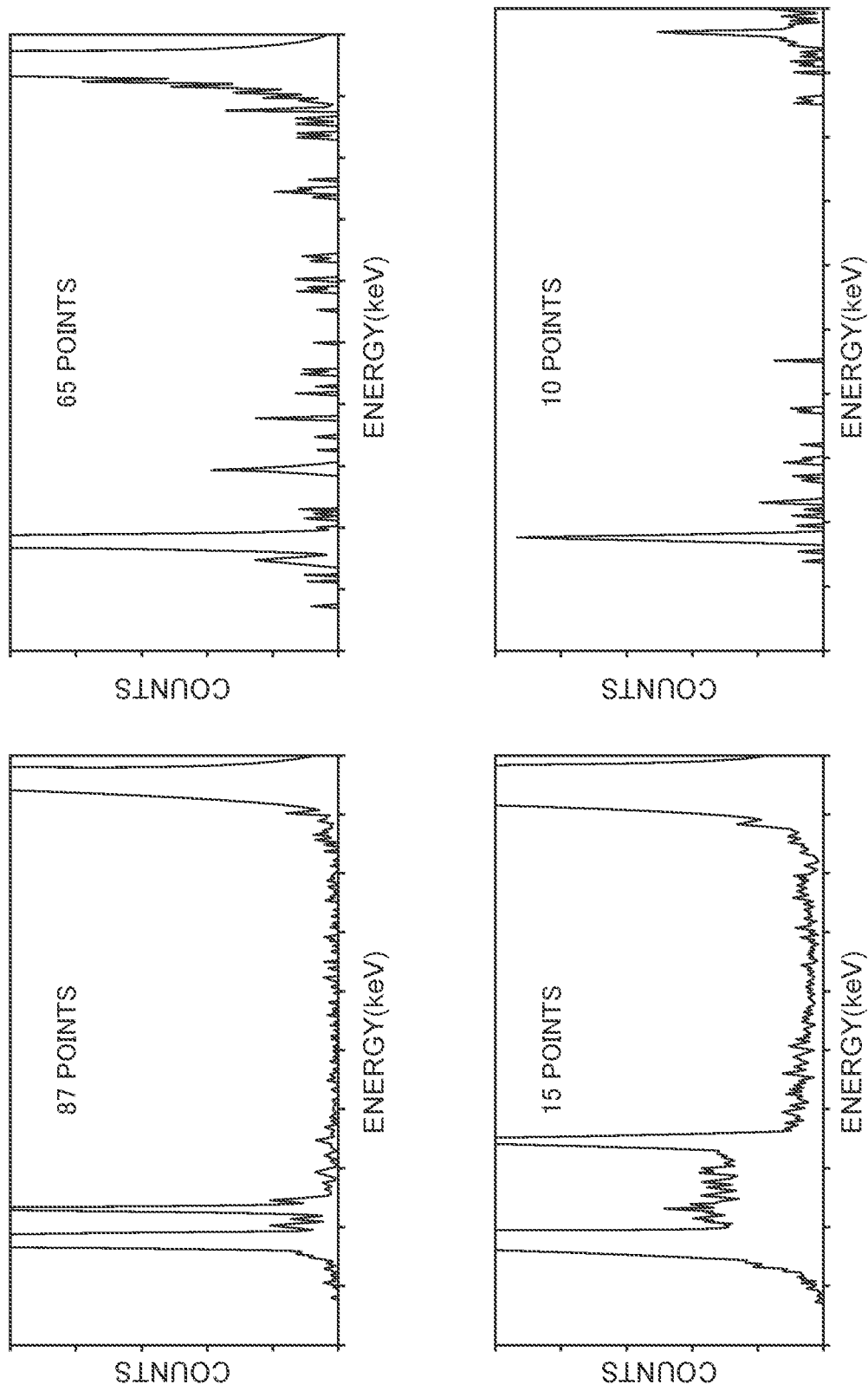
FIG. 10 is a graph showing an example of the evaluation results.

Moreover, the display unit 122 displays the comprehensive evaluation value $V_{a11}$ as a comprehensive point. For example, in the evaluation result of FIG. 9, a comprehensive point of 67 points is displayed. The display unit 122 may display the comprehensive evaluation value $V_a$n calculated by the evaluation unit 120 such that the comprehensive evaluation value is superimposed on the spectrum and the measurement results. Specifically, for example, as shown in FIG. 10, the comprehensive evaluation value $V_{a11}$ may be displayed so that the comprehensive evaluation value $V_{a11}$ is superimposed on each spectrum acquired by the spectrum acquisition unit 102. A user who is unfamiliar with the X-ray fluorescence spectrometry cannot determine the degree of reliability of the series of processes relating to the analysis by only observing each spectrum of FIG. 10. However, when the comprehensive evaluation value $V_{all}$ is displayed as shown in FIG. 10, the user can recognize rough reliability of the series of processes relating to the analysis.

As described above, the display unit 122 displays the respective evaluation values, the graphs, and the comprehensive point, and the user can thus recognize the reliability of the series of processes relating to the analysis without checking the spectrum. Moreover, when a specific evaluation value is low, a cause for the low evaluation value can be easily identified. Further, the comprehensive point is displayed, and thus, even when the user does not check each evaluation value, the user can recognize the rough reliability of the series of processes relating to the analysis.

The present invention can be variously modified without being limited to the above-mentioned embodiment. The configuration of the above-mentioned X-ray fluorescence spectrometer 100 is described as one example, and the present invention is not limited thereto. The configuration described in the above-mentioned embodiment may be replaced by a configuration that is substantially the same as the configuration described in the above-mentioned embodiment, a configuration that exhibits the same action and effect as those of the configuration described in the above-mentioned embodiment, or a configuration that achieves the same object as that of the configuration described in the above-mentioned embodiment. For example, in the description given above, the fitting is executed to calculate the peak intensity, but the peak intensity may be calculated by the ROI method.

Figure 11:
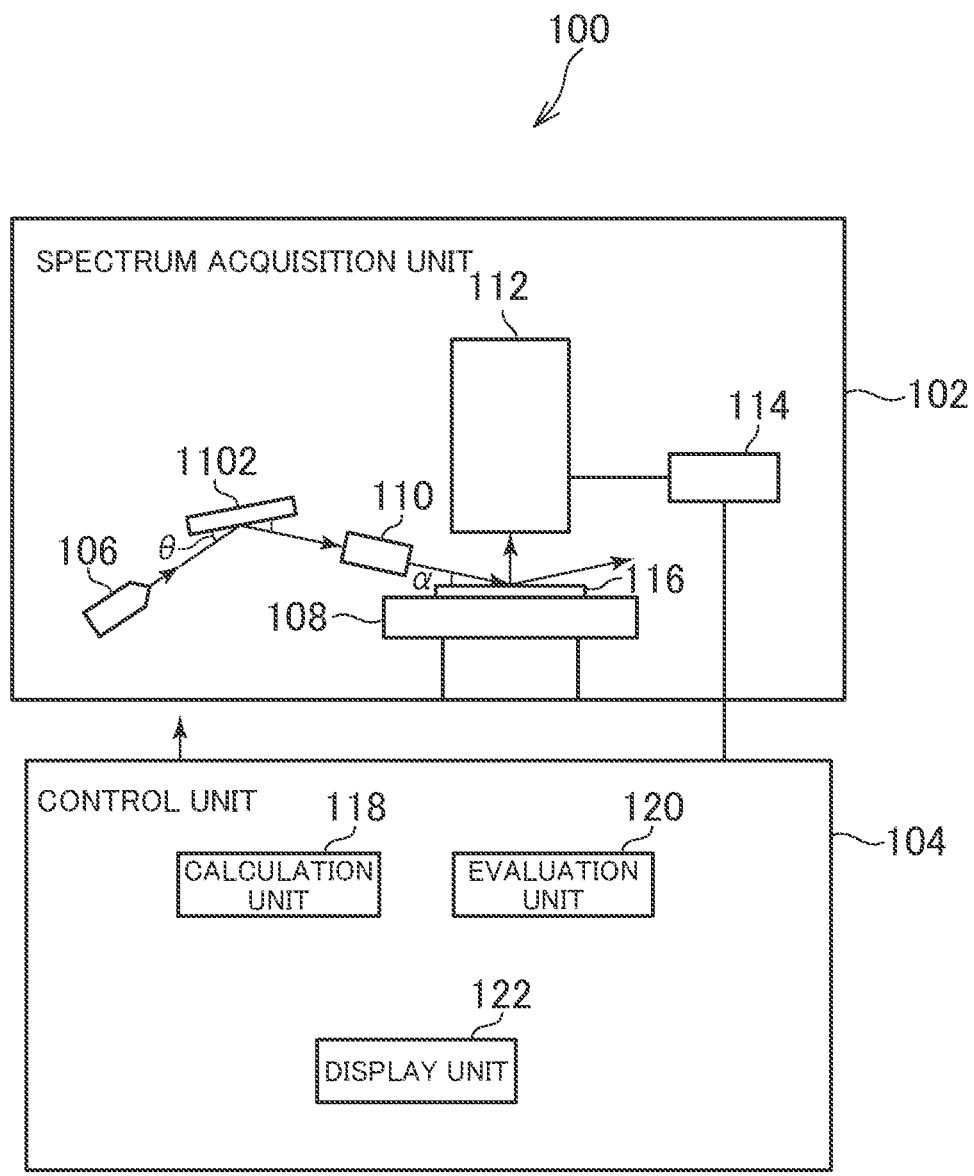
FIG. 11 is a diagram schematically illustrating a total reflection X-ray fluorescence spectrometer.

Moreover, the X-ray fluorescence spectrometer 100 may be a total reflection X-ray fluorescence spectrometer. Specifically, FIG. 11 is a diagram for schematically illustrating a total reflection X-ray fluorescence spectrometer. In the example of FIG. 11, the X-ray fluorescence spectrometer 100 includes, in addition to the configuration of FIG. 1, a monochromator 1102 arranged at a position irradiated with the primary X-rays emitted by the X-ray source 106. Moreover, the attenuator 110 is arranged between the monochromator 1102 and the sample 116. The surface of the monochromator 1102 is irradiated with the primary X-rays at an incident angle θ. The primary X-rays satisfying the reflection condition of Bragg are emitted from the monochromator 1102. That is, the monochromator 1102 extracts primary X-rays having a specific energy from the primary X-rays having various energies emitted from the X-ray source 106. The surface of the sample 116 is irradiated with the extracted primary X-rays having the specific energy at an incident angle equal to or smaller than a degrees through the attenuator 110. The a degrees is an angle equal to or smaller than the total reflection critical angle. From the sample 116 irradiated with the primary X-rays, fluorescent X-rays are emitted. The detector 112 is arranged directly above a position irradiated with the primary X-rays. With the total reflection X-ray fluorescence spectrometer, it is possible to obtain a spectrum having low background.

REFERENCE SIGNS LIST

100 X-ray fluorescence spectrometer, 102 spectrum acquisition unit, 104 control unit, 106 X-ray source, 108 sample stage, 110 attenuator, 112 detector, 114 multi-channel analyzer, 116 sample, 118 calculation unit, 120 evaluation unit, 122 display unit, 302 peak to be measured, 304 center peak, 1102 monochromator

The invention claimed is:

1. An energy-dispersive X-ray fluorescence spectrometer, comprising:
  a spectrum acquisition unit configured to acquire, based on secondary X-rays emitted from a sample irradiated with primary X-rays, a spectrum indicating a relationship between an intensity of the secondary X-rays and energy;
  a calculation unit configured to execute quantitative analysis for an element included in the sample based on a peak included in the spectrum; and
  an evaluation unit configured to calculate a plurality of evaluation values obtained using different calculation methods for a series of processes being a process of acquiring the spectrum by the spectrum acquisition unit and a process of executing the quantitative analysis by the calculation unit, and to calculate a comprehensive evaluation value obtained by composing the plurality of evaluation values.

2. The energy-dispersive X-ray fluorescence spectrometer according to claim 1, further comprising a display unit configured to display a graph for each of the plurality of evaluation values.

3. The energy-dispersive X-ray fluorescence spectrometer according to claim 1, wherein the plurality of evaluation values include an evaluation value calculated based on a measurement condition at a time when the spectrum acquisition unit acquires the spectrum.

4. The energy-dispersive X-ray fluorescence spectrometer according to claim 1, wherein the plurality of evaluation values include an evaluation value calculated based on a shape of the spectrum.

5. The energy-dispersive X-ray fluorescence spectrometer according to claim 1, wherein the plurality of evaluation values include an evaluation value calculated based on a fitting parameter obtained as a result of fitting to the spectrum.

6. The energy-dispersive X-ray fluorescence spectrometer according to claim 3, wherein the evaluation value is calculated based on a measurement period, being a period for detecting the secondary X-rays.

7. The energy-dispersive X-ray fluorescence spectrometer according to claim 3, wherein the evaluation value is calculated based on a ratio of a period occupied by a dead time, which does not contribute to a measurement result, to a measurement period, being a period for detecting the secondary X-rays.

8. The energy-dispersive X-ray fluorescence spectrometer according to claim 3, wherein the evaluation value is calculated based on whether an attenuator configured to attenuate the secondary X-rays is used when the secondary X-rays are detected.

9. The energy-dispersive X-ray fluorescence spectrometer according to claim 4, wherein the evaluation value is calculated based on a matching rate between an intensity of the peak included in the spectrum and a reference intensity which is set in advance in correspondence with the peak.

10. The energy-dispersive X-ray fluorescence spectrometer according to claim 4, wherein the evaluation value is calculated based on a ratio between an intensity of the peak included in the spectrum and an intensity of background other than the peak.

11. The energy-dispersive X-ray fluorescence spectrometer according to claim 4, wherein the evaluation value is calculated based on a difference between a measurement value of energy of the peak included in the spectrum and a theoretical value of the energy of the peak.

12. The energy-dispersive X-ray fluorescence spectrometer according to claim 4, wherein the evaluation value is calculated based on a difference between a measurement value indicating a width of the peak included in the spectrum and a reference value indicating a width which is set in advance in correspondence with the peak.

13. The energy-dispersive X-ray fluorescence spectrometer according to claim 5, wherein the evaluation value is calculated based on a matching rate between the peak included in the spectrum and a profile obtained by executing fitting for the peak.

14. The energy-dispersive X-ray fluorescence spectrometer according to claim 5, wherein the evaluation value is calculated based on the number of combinations of a peak used for quantification of an element to be analyzed and a peak caused by a different element and determined to overlap the peak of the element to be analyzed as a result of the fitting to the spectrum.

15. An evaluation method, comprising:
a measurement step of acquiring, by an energy-dispersive X-ray fluorescence spectrometer, based on secondary X-rays emitted from a sample irradiated with primary X-rays, a spectrum indicating a relationship between an intensity of the secondary X-rays and energy;
a calculation step of executing quantitative analysis for an element included in the sample based on a peak included in the spectrum; and
an evaluation step of calculating a plurality of evaluation values obtained using different calculation methods for a series of processes, being a process of acquiring the spectrum in the measurement step and a process of executing the quantitative analysis in the calculation step, and calculating a comprehensive evaluation value obtained by composing the plurality of evaluation values;
wherein the plurality of evaluation values include an evaluation value calculated based on measurement conditions at the time when the spectrum is acquired, an evaluation value calculated based on a shape of the spectrum, and an evaluation value calculated based on a fitting parameter obtained as a result of a fitting to the spectrum; and
wherein the comprehensive evaluation value indicates a reliability of the series of processes.

16. A non-transitory computer-readable information storage medium for storing a program for causing a computer used for an energy-dispersive X-ray fluorescence spectrometer to execute:
a measurement step of acquiring, based on secondary X-rays emitted from a sample irradiated with primary X-rays, a spectrum indicating a relationship between an intensity of the secondary X-rays and energy;
a calculation step of executing quantitative analysis for an element included in the sample based on a peak included in the spectrum; and
an evaluation step of calculating a plurality of evaluation values obtained using different calculation methods for a series of processes, being a process of acquiring the spectrum in the measurement step, and a process of executing the quantitative analysis in the calculation step, and calculating a comprehensive evaluation value obtained by composing the plurality of evaluation values;
wherein the plurality of evaluation values include an evaluation value calculated based on measurement conditions at the time when the spectrum is acquired, an evaluation value calculated based on a shape of the spectrum, and an evaluation value calculated based on a fitting parameter obtained as a result of a fitting to the spectrum; and
wherein the comprehensive evaluation value indicates a reliability of the series of processes.

* * * * *